3,424,719
URETHANE MODIFIED EPOXY RESINS
John E. Masters, Louisville, Ky., assignor to Celanese Coatings Company, New York, N.Y., a corporation of Delaware
No Drawing. Filed Mar. 6, 1967, Ser. No. 620,617
U.S. Cl. 260—47          7 Claims
Int. Cl. C08g 30/02

ABSTRACT OF THE DISCLOSURE

Fusible soluble urethane modified glycidyl polyethers of dihydric phenols obtained by reacting hydroxyl containing glycidyl polyethers with organic diisocyanate compounds.

BACKGROUND OF THE INVENTION

Glycidyl polyethers of dihydric phenols are well known compositions made by reacting a dihydric phenol with various amounts of epichlorohydrin using caustic as the condensation and dehydrohalogenation catalyst. These glycidyl polyethers can be represented by the following formula:

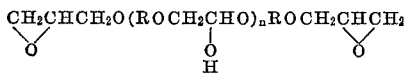

wherein R is the nucleus of a dihydric phenol and $n$ is 0 to 10 or higher. The polyethers shown by the formula in theory contain 2 terminal glycidyl groups and are difunctional with respect to epoxide reactivity. However, in actuality, the polyethers only approach an opoxide functionality of two. Due to hydrolysis or incomplete dehydrohalogenation, small amounts of the end groups are not glycidyl but are glyceryl or chlorohydrin. The epoxide functionality of commercial glycidyl ethers of dihydric phenols is somewhat less than 2 unless they are purified by distillation, crystalization, or extraction. These glycidyl polyethers contain varying amounts of aliphatic hydroxyl groups which are present from polymer formation (when $n$ in the formula is greater than 0) or from non-epoxide end groups.

SUMMARY OF THE INVENTION

By this invention glycidyl polyethers of dihydric phenols having increased epoxide functionality are made. Modified glycidyl polyethers of dihydric phenols are prepared by reacting aliphatic hydroxyl groups present in the polyethers with organic diisocyanates. Glycidyl polyether molecules are coupled through the formed di-urethane linkages. Although the epoxide content of the overall mixture is not raised, the epoxide functionality per average molecule is increased.

These higher functional, urethane modified glycidyl polyethers when reacted with curing agents form cured products with improved resistance properties due to higher cross-linking density. Resins having higher heat distortion temperatures and films with better chemical and physical resistance are produced from these resins than from the unmodified resins.

DESCRIPTION OF THE INVENTION

The glycidyl polyethers of dihydric phenols useful in this invention have average molecular weights less than 1000, average hydroxyl content of from about 0.1 to about 3.5 hydroxyl groups per average molecule, and epoxide content of more than one to two glycidyl groups per average molecule. Such glycidyl polyethers are prepared by reacting about 1.5 mols to about 10 mols of epichlorohydrin with 1 mol of dihydric phenol using caustic alkali as the condensing and dihydrohalogenating agent.

The dihydric phenols from which the glycidyl polyethers are prepared contain 2 phenolic hydroxyl groups and no other groups reactive with epoxide groups or isocyanate groups. Examples of such dihydric phenols are p,p'-dihydroxydiphenyl propane (commonly named Bisphenol A), dihydroxydiphenyl, dihydroxydiphenyl sulfone, dihydroxybenzophenone, resorcinol, hydroquinone, dihydroxynaphthalene, and the like. The preferred dihydric phenol is Bisphenol A.

The organic diisocyanate compounds used in this invention contain two isocyanate groups and no other groups reactive under the conditions of the reaction. Examples of such diisocyanate compounds are tolylene diisocyanate, dianisidinediisocyanate, diisocyanatodiphenylmethane, hexamethylene diisocyanate, xylylene diisocyanate, naphthalene diisocyanate and the like.

The glycidyl polyether of the dihydric phenol and the diisocyanate compound are reacted in the ratio of about 0.1 to about 1.0 isocyanate group per mol of glycidyl polyether with the ratio of isocyanate groups to hydroxyl groups present in the polyether being no more than one. When using low molecular weight glycidyl polyethers having hydroxyl contents of one or less than one per average molecule, the ratio of isocyanate groups to hydroxyl groups can approach one, i.e., up to about 1 equivalent of isocyanate can be reacted with each hydroxyl group in the polyether. When higher molecular weight polyethers are used which have more than one hydroxyl group per molecule, the ratio of isocyanate groups to hydroxyl groups will be much lower than one, since the maximum usable amount of isocyanate is about 1.0 equivalent per mol of polyether. Use of higher amounts of isocyanate will result in crosslinking and gelation.

These limitations on reaction ratios can be demonstrated as follows:

A low molecular weight glycidyl polyether of a dihydric phenol has an average molecular weight of 360 and a hydroxyl content of 0.25 hydroxyl group per average molecule. From about 0.1 to about 0.25 isocyanate equivalent (one mol of diisocyanate equals 2 equivalents of isocyanate) can be reacted with each mol (360 grams) of the glycidyl polyether. Use of more than 0.25 equivalent leaves unreacted isocyanate groups which can react with the glycidyl groups leading to viscosity instability and eventual gelation. Less than 0.1 isocyanate equivalent can be used with no detrimental effect. However, the minor improvements in functionality and performance are offset by the increased processing and raw material costs.

A higher molecular weight glycidyl polyether of a dihydric phenol has an average molecular weight of 890 and a hydroxyl content of 3.2 hydroxyl groups per average molecule. From about 0.1 to about 1.0 isocyanate equivalent can be reacted with each mol (890 grams) of the glycidyl polyether. If more than 1.0 isocyanate equivalent is used, the isocyanate groups react with the unreacted hydroxyl groups forming gelled cross-linked products.

The glycidyl polyether of the dihydric phenol and the diisocyanate compound are reacted at a temperature of about 25° C. to 150° C., preferably 75° C. to 125° C., for a time sufficient for all the isocyanate groups to react. This time will vary depending upon the particular reactants being used as well as the temperature. Generally the time is between about 1 hour to about 10 hours. Catalysts, such as metal alkyl carboxylates, metal carboxylates and tertiary amines can be used if desired. However, the use of catalysts has not been found necessary in this invention.

Solvents which contain no groups reactive with isocyanate, epoxide or hydroxyl groups can also be used to lower the viscosity of the reactants to facilitate handling and mixing during reaction. Examples of such solvents are methyl ethyl ketone, methyl isobutyl ketone, toluene, xylene, ethylene glycol monoethyl ether acetate, ethyl acetate and the like.

As stated hereinbefore, the reaction of the glycidyl polyether of the dihydric phenol and the diisocyanate compound is conducted to the complete reaction of the isocyanate groups, i.e., until no free isocyanate groups are left. The presence or absence of isocyanate groups can be determined by the following test:

As stated hereinbefore, the reaction of the glycidyl polyether of the dihydric phenol and the diisocyanate compound is conducted to the complete reaction of the isocyanate groups, i.e., until no free isocyanate groups are left. The presence or absence of isocyanate groups can be determined by the following test:

A few drops of the reaction mixture are placed in a test tube and are dissolved in 5 to 10 ml. of acetone. A drop of a saturated aqueous sodium nitrate solution is added with stirring to the test tube. The development of a yellow or amber color within a few minutes indicates the presence of unreacted isocyanate. The absence of color development indicates complete reaction.

The urethane modified glycidyl polyethers of dihydric phenols can be cured with any of the well known epoxy resin curing agents to form products useful in laminates, castings, protective coatings and the like.

The following examples illustrate methods for conducting this invention. Parts where used are parts by weight.

Example 1

To a suitable reaction flask equipped with a mechanical stirrer, thermometer, reflux condenser and gas inlet tube were added 1000 parts of the diglycidyl ether of Bisphenol A having an epoxide equivalent weight of 191, an average molecular weight of 366 and a hydroxyl content of 0.25 hydroxyl group per average molecule. Carbon dioxide gas was introduced into the reactor and 43 parts of tolylene diisocyanate were added. The reactants were heated at 95° C. for 7 hours at which time all the isocyanate groups had reacted as indicated by the sodium nitrite test. The product had a Gardner-Holdt viscosity at 25° C. of $Z_{6+}$, a Gardner color of 3 and an epoxide equivalent weighet of 196.5.

Castings were prepared from 100 parts of the reaction product blended with 20 parts of methylene dianiline and were cured by heating at 100° C. for one hour and at 200° C. for two hours. The cured casting had a heat distortion temperature of 165° C. The unmodified diglycidyl ether, cured in the same manner, had a heat distortion temperature of 155° C.

Example 2

Using the same procedure as was described in Example 1, 100 parts of the diglycidyl ether described in Example 1 were reacted with 8.9 parts of dianisidine-diisocyanate. The resulting product had an epoxide equivalent weight of 207 and a viscosity of 25° C. of 59,000 c.p.s.

Example 3

Using the same procedure as was described in Example 1, 400 parts of a glycidyl polyether of Bisphenol A having an opoxide equivalent weight of 244.5, an average molecular weight of 466 and a hydroxyl content of 0.65 hydroxyl group per average molecule were reacted with 41.9 parts of tolylene diisocyanate. The product had an epoxide equivalent weight of 287 and a Durran's melting point of 68° C.

The reaction product was dissolved in a 57.5/42.5 methyl isobutyl ketone-xylene solution at 66% solids. The solution was blended with 1.5 equivalents of tetraethylene pentamine based on epoxide content. One hour after blending, test tubes were dipped in the solution and, after draining, were dried for one week at room temperature. The test tubes were then immersed in various solutions to test the coatings for resistance properties. The coatings did not exhibit failure in methyl isobutyl ketone until the sixth day; in 10% aqueous sodium hydroxide until the sixth day; in 10% aqueous ammonia until the fifth day; and in 10% sulfuric acid until the fifth day.

Films which were baked for 20 minutes at 150° C. exhibited no failure after 30 days immersion in methyl isobutyl ketone and xylene.

Example 4

Using the same procedure as was described in Example 1, 100 parts of the glycidyl polyether used in Example 3 were reacted with 15.1 parts of diisocyanato-diphenyl-methane. The resulting product had an epoxide equivalent weight of 317 and a Durran's melting point of 73° C.

Example 5

To a suitable reactor equipped as described in Example 1, were added 266.7 parts of a solution of a glycidyl polyether of Bisphenol A at 75% solids in a 65/35 methyl isobutyl ketone-xylene solution. The glycidyl polyether had an epoxide equivalent weight of 500, an average molecular weight of 888 and a hydroxyl content of 3.2 hydroxyl groups per molecule. Methyl isobutyl ketone, 69 parts, and xylene, 82 parts, were added. The solution was stirred and blanketed with carbon dioxide gas. Tolylene diisocyanate, 17.4 parts, was added and heat was applied raising the temperature to 95° C. After 1.5 hours at 95° C., all the isocyanate groups had reacted as indicated by a negative nitrite test. The product at 50% solids in methyl isobutyl ketone-xylene (52/48 by weight) had a Gardner-Holdt viscosity at 25° C. of X-Y and an epoxide equivalent weight of 542 on solids basis.

To 200 parts of the product solution were added 6 parts of tetraethylene pentamine. One hour after the addition, films were drawn down on electrolytic tin plate using a 3 mil doctor blade. The films were cured by baking for 20 minutes at 125° C. The film had a pencil hardness of 7H, excellent resistance to acetone and boiling water and excellent mar resistance.

Example 6

Using the same procedure as was described in Example 1, 100 parts of a glycidyl polyether of Bisphenol A, having an epoxide equivalent weight of 400, an average molecular weight of 520 and a hydroxyl content of 1.8 hydroxyl groups per average molecule, were reacted with 10 parts of tolylene diisocyanate. The resulting product had a Durran's melting point of 76° C. and an epoxide equivalent weight of 448.

The diglycidyl ether of Bisphenol A described in Example 1 and 2 was prepared by reacting one mol of Bisphenol A with 10 mols of epichlorohydrin using 2 mols of sodium hydroxide as condensing and dehydrohalogenating agent.

The glycidyl polyether described in Examples 3 and 4 was prepared by reacting one mol of Bisphenol A with 2.6 mols of epichlorohydrin using 2.86 mols of sodium hydroxide as catalyst.

The glycidyl polyether described in Example 5 was prepared by reacting one mol of Bisphenol A with 1.57 mols of epichlorohydrin using 1.88 mols of sodium hydroxide as catalyst.

The glycidyl polyether described in Example 6 was prepared by reacting one mol of Bisphenol A with 2 mols of epichlorohydrin using 2.2 mols of sodium hydroxide as catalyst.

It is to be understood that the foregoing detailed description is given merely by way of illustration and that many variations may be made therein without departing from the spirit of the invention.

The embodiments of this invention in which an exclusive property or privilege is claimed are defined as follows:

1. A fusible, soluble urethane modified glycidyl polyether of a dihydric phenol which comprises the reaction product of (A) an organic diisocyanate compound containing 2 isocyanate groups per molecule and no other groups reactive with hydroxyl or epoxide groups with (B) a glycidyl polyether of a dihydric phenol having more than one but no more than two 1,2-epoxide groups per average molecule, an average molecular weight of less than 1,000, a hydroxyl content of about 0.1 to about 3.5 hydroxyl groups per average molecule and no other groups reactive with isocyanate groups, wherein (A) and (B) are reacted at a temperature of about 30° C. to about 150° C. in the ratio of about 0.1 to about 1.0 isocyanate group to 1 mol of glycidyl polyether with the ratio of isocyanate groups to hydroxyl groups being no more than one.

2. The composition of claim 1 wherein the glycidyl polyether of the dihydric phenol contains less than one hydroxyl group per average molecule and the maximum amount of isocyanate groups reacted are equivalent to the hydroxyl groups present in the glycidyl polyether.

3. The composition of claim 1 wherein the glycidyl polyether of the dihydric phenol contains at least one hydroxyl group per average molecule and the maximum amount of isocyanate groups reacted are equivalent to the mols of gylcidyl polyether.

4. The composition of claim 1 wherein the glycidyl polyether of the dihydric phenol is the glycidyl polyether of p,p'-dihydroxydiphenyl propane and the isocyanate compound is tolylene diisocyanate.

5. A process for preparing fusible, soluble urethane modified glycidyl polyethers of dihydric phenols which comprises reacting (A) an organic diisocyanate compound containing 2 isocyanate groups per molecule and no other groups reactive with hydroxyl or epoxide groups with (B) a glycidyl polyether of a dihydric phenol having more than one but no more than two 1,2-epoxide groups per average molecule, an average molecular weight of less than 1000, a hydroxyl content of about 0.1 to about 3.5 hydroxyl groups per average molecule and no other groups reactive with isocyanate groups, wherein (A) and (B) are reacted in the ratio of about 0.1 to about 1.0 isocyanate group to 1 mol of glycidyl polyether with the ratio of isocyanate groups to hydroxyl groups being no more than one, at a temperature of about 30° C. to about 150° C. for a time sufficient to react all the isocyanate groups.

6. The process of claim 5 wherein the temperature of reaction is about 75° C. to 125° C.

7. The process of claim 5 wherein the glycidyl polyether of the dihydric phenol is the glycidyl polyether of p,p'-dihydroxydiphenyl propane and the diisocyanate compound is tolylene diisocyanate.

References Cited

UNITED STATES PATENTS 2,799,663  7/1957  Hampton et al. _____ 260—47

WILLIAM H. SHORT, *Primary Examiner.*

T. D. KERWIN, *Assistant Examiner.*

U.S. Cl. X.R.

117—161; 161—184; 260—31.2, 32.8, 33.6, 49, 348